United States Patent [19]

van Acker

[11] 3,947,742

[45] Mar. 30, 1976

[54] METHOD OF CONTROLLING AN ELECTRIC MOTOR

[75] Inventor: Paul Antonius Ferdinand van Acker, Rijswijk, Netherlands

[73] Assignee: U.S. Philips Corporation, New York, N.Y.

[22] Filed: Sept. 27, 1971

[21] Appl. No.: 183,830

[30] Foreign Application Priority Data

Sept. 30, 1970 Netherlands ........................ 7014339

[52] U.S. Cl. .................. 318/611; 318/685; 318/696

[51] Int. Cl.² .............................................. G05B 5/01

[58] Field of Search ...................... 318/696, 685, 611

[56] References Cited

UNITED STATES PATENTS

| | | | |
|---|---|---|---|
| 2,793,335 | 5/1957 | Woodruff | 318/611 |
| 3,051,883 | 8/1962 | Smith | 318/611 |
| 3,345,547 | 10/1967 | Dunne | 318/696 |
| 3,386,018 | 5/1968 | Smith-Vaniz | 318/696 |

*Primary Examiner*—B. Dobeck

*Attorney, Agent, or Firm*—Frank R. Trifari; Bernard Franzblau

[57] ABSTRACT

A method of controlling a motor in which an elastic element is coupled in a sub-critically damped manner to the load and the natural frequency of the system which comprises the elasticity of the element and the mass of the driven part is utilized to cause the speed of the load to increase and to decrease as quickly as possible.

9 Claims, 5 Drawing Figures

Figure 1:
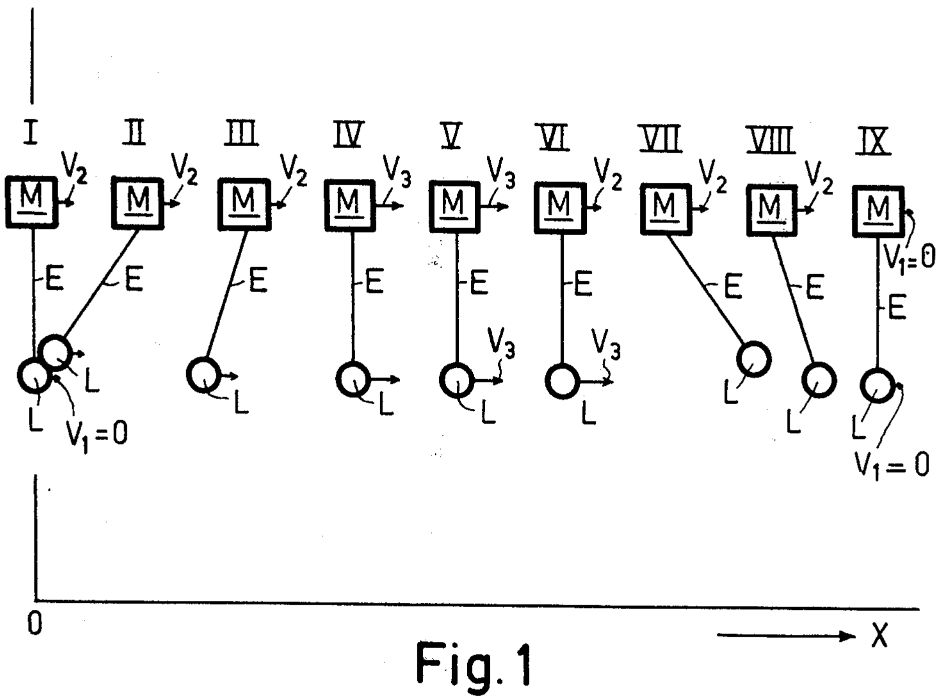

INVENTOR.
PAUL A.F. VAN ACKER

BY
AGENT

INVENTOR.
PAUL A.F. VAN ACKER

BY
Frank R. Trifari
AGENT

METHOD OF CONTROLLING AN ELECTRIC MOTOR

This invention relates to a method of controlling an electric motor which may be coupled to a load more or less elastically and in a sub-critically damped manner. It should be pointed out that various forms of the said elastic coupling may be of used. It may be an elastic connection between, for example, a motor shaft and its load, but it may also be constituted by the field forces between the rotor and the stator, in which case the term "motor" is to be understood to mean the stator with the driving stator field only, or by a combination of the said cases. In the case of sufficiently large speed variations the elastic coupling may give rise to oscillations of the load relative to the motor. These oscillations may be troublesome especially in the case of a low degree of damping. During the movement they give rise to unstable running and under certain conditions they may limit the driving speed. For example, in the case where a load is driven by means of a stepping motor, the elastic element is constituted by the forces between the stator field and the rotor field, the stepping speed is adversely affected by excessive oscillations. On the other hand, when the motor is stopped, these oscillations may give rise to undesirable hunting around the end position. In order to reduce the duration of the oscillations to a minimum, according to a feature of the invention, a speed variation is effected in at least one step, each step comprising two stages in the first of which the motor is brought from a first speed to a second speed, while the load initially persists in its original movement and then returns to its equilibrium position relative to the motor, while in the second stage of the step the motor is brought from the second speed to a third speed such that when the third speed is reached, the load for the first time reaches the said equilibrium position, and the difference in speed between the motor and the load is then substantially equal to zero. This enables the starting of such an arrangement to proceed faster. If the arrangement is accelerated from a first speed, which in this case is equal to zero, to a second speed, the load will initially lag and then resile to its first equilibrium position relative to the motor. The invention ensures that at the instant at which the load has reached its equilibrium position the speed of the motor is equal to the speed of the load (third speed) so that hunting of the load is avoided. In the case of small friction losses in the elastic coupling the third speed on starting will be substantially twice the second speed. In particular in those cases in which when a given critical force is exceeded the elastic coupling may assume the next position, the second speed may be made slightly lower, so that the critical force is not exceeded and nevertheless a high speed is attained in a short time. When the third speed is reached, this process may be repeated by again causing the motor speed to increase in two stages. The same procedure is used for stopping, in which in the last but one stage the speed of the motor is reduced at so high a rate that the speed of the load initially will be higher than that of the motor, while at the instant at which the load again reaches its equilibrium position relative to the motor the motor is stopped. The speed of the load relative to the environment then will be substantially equal to zero. Thus, the oscillation of the load relative to the motor is reduced to one half cycle.

If the speed is to be increased or decreased in a plurality of steps, according to another feature of the invention, the second stage of one step is advantageously made to coincide with the first stage of the next step. This reduces to a minimum the time required to attain the entire speed variation since now there is no time interval between the steps.

An arrangement for carrying out the method according to the invention includes a signal generator, one output of which is connected to an input of a control device, the output of which is coupled to a speed regulator to which the motor is connected and which is capable of setting the motor speed to at least three values under the command of the said control device. In this arrangement, after the motor speed has been switched from a first value to a second value by the control device, the signal generator delivers a signal to the control device so that, by means of the speed regulator, the said motor speed reaches a third value at the instant at which the load has first reaches an equilibrium position relative to the motor. At that instant the difference in speed between the load and the motor has become substantially zero.

Depending upon the nature and the inertia of the motor, the change from the second to the third speed may be effected gradually or even abruptly. For direct-current motors, the regulation will in general take place gradually, but in stepping motors in which the magnetic field between the stator and the rotor acts as the resilient element, it may be effected abruptly because the inertia of the stator field is very small.

For these motors the control may be effected in a generally known manner such as, for example, voltage control in direct-current motors and frequency control in stepping motors.

If the load and the values of the speeds are always the same, in an embodiment of an arrangement according to the invention the signal generator may be a simple time switch. This switches the motor speed from the second value to the third value after a predetermined fixed period of time so that the third speed is reached when the speeds of the motor and the load are at least substantially equal.

A control which adapts itself to varying circumstances is obtained if, in another embodiment of an arrangement according to the invention, the signal generator is a position detector. This measures the position of the load relative to the drive and in accordance with the measurement applies a signal to the control device which, through the speed regulator, adapts the speed of the motor to that of the load.

In a further embodiment of an arrangement according to the invention for controlling a stepping motor, a signal generator includes a forwards and backwards counter into which the desired number of steps is introduced and an output of which is connected to the control device, while the speed controller coupled to it is provided with terminals to which a stepping motor may be connected. The speed controller also is connected to a backward counting input of the counter for returning a signal at the frequency of the motor feed pulses.

This enables a load to be brought from a first position to a second position at optimum speed.

Figure 3:
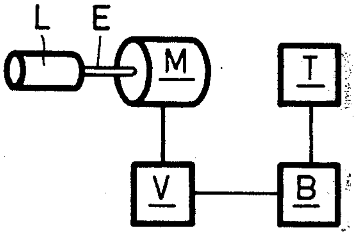
Figure 4:
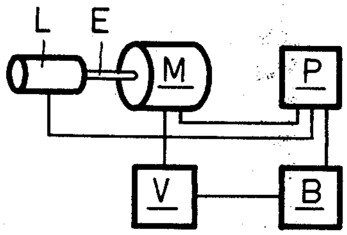
Figure 5:
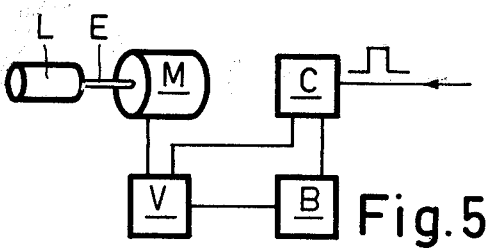
Figure 2:
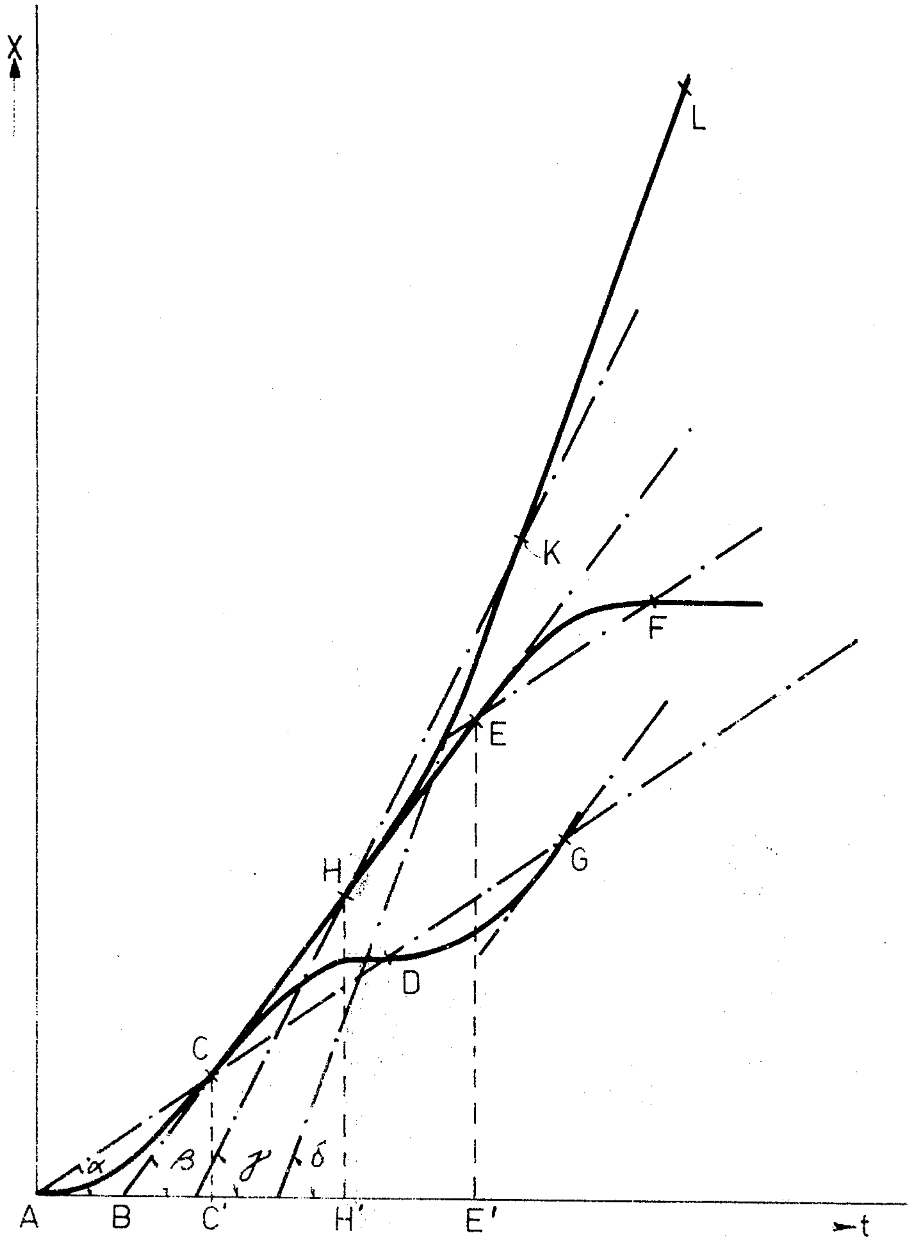

Embodiments of the invention will now be described, by way of example, with reference to the accompanying diagrammatic drawings, in which:

FIG. 1 shows the principle of the invention,

FIG. 2 is a graph showing the displacements of the motor and the load as functions of time, FIG. 3 shows block-schematically an arrangement according to the invention including a time switch as a signal generator, FIG. 4 shows block-schematically an arrangement according to the invention including a position detector as the signal generator, and FIG. 5 shows block-schematically a control arrangement for driving a stepping motor.

Referring now to FIG. 1, the principle of the invention is shown with reference to an example in which M denotes a motor, L a load and E an elastic coupling, the arrangement taking the form of a frictionless pendulum. At an instant $t = 0$ the displacement of the motor and that of the load still are equal to zero, but the motor is switched on to run at a first speed $v_2$. After some time the motor has reached position II, whereas the load, owing to its inertia, still is substantially in its initial position, although it has already commenced to follow the movement of the motor. In position III, the load is clearly moving to its equilibrium position relative to the motor, during which movement its speed relative to its surroundings is progressively increasing. In position IV, the load has just, for the first time, reached its equilibrium position relative to the motor and, if the oscillation is not damped, it exactly has a speed $v_3 = 2.v_2$.

If, as is the case in a known control arrangement, the speed of the motor were maintained constant, the load would swing forward relative to the motor, then swing backward and so on, resulting in highly undesirable irregular running. If, however, according to the invention, in the position IV the motor speed is also raised to the value $V_3$, then, as is shown by the position V, the load will move at the same rate as the motor. Positions VI to IX indicate the procedure for stopping. In the position VI the speed of the motor is reduced to the value $V_2$ again so that the load will swing forward relative to the motor, as is indicated in the position VII. Then the load swings back relative to the motor and in the position IX has reached its equilibrium position relative to the motor again. However, this is exactly the instant at which the speed of the load relative to the surroundings has become equal to zero so that when the motor is stopped at this instant, the load remains stationary relative to its surroundings and to the motor and without oscillation. The entire process is shown more fully in FIG. 2 in which the displacement $x$ is plotted along the vertical axis and the time $t$ along the horizontal axis. The speed $v_2$ is equal to tan $\alpha$ so that the displacement of the motor is effected along a dot-dash line AC. The displacement of the load is indicated by a solid line AC which at point C is tangent to a line BC which has a slope $\beta$, where tan $\beta$ is equal to 2 tan $\alpha$, i.e. the speed $v_3$ of the load is equal to tan $\beta = 2.v_2$. If the speed of the motor were now maintained constant, the load would swing to and fro relative to the motor according to a solid line CDG and so on.

However, if at an instant C′ the motor speed is raised to the value $v_3$, the motor and the load will run as an integral unit along a line CE. At an instant E′, which corresponds to the point E, the motor speed is reduced to $v'_2 = v_2$ and the motor continues running along a dot-dash line EF, while the load again swings on according to a solid line EF. At the point F the load has reached its equilibrium position relative to the motor and its speed relative to the surroundings has become equal to zero. At this instant the motor is stopped so that no further swinging of the load will occur.

If the motor speed is to be further increased, then the speed of the motor may be increased, for example, at an instant H′, which corresponds to the point H on the line CE, to a value $v_4$ equal to $3.v_2 = \tan \gamma$ so that the motor moves on along a dot-dash line HK and the load again swings on along a solid line HK. At the point K, the load has again reached its equilibrium position relative to the motor and the motor speed is increased to a value $V_5 = 4.v_2 = \tan \delta$, so that the speeds of the motor and of the load are equal again and the motor and the load will both travel in unison along a line KL. By enduring that the first stage of the second step immediately follows the second stage of the first step, so that in FIG. 2 points H and C coincide, the speed increase takes place at the highest possible rate. When the pendulum is not frictionless, the speeds $v_2$ and $v'_2$ will not be exactly equal to one another and will have to be adapted to the prevailing conditions. In braking, a reverse procedure is followed and therefore two steps each consisting of two stages are again used, which is not shown.

In FIG. 3, a motor M is connected through an elastic coupling E to a load L. This motor M is supplied from a speed regulator V, which in turn is controlled by a control device B. The input of this control device is connected to an output of a signal generator in the form of a timing switch T. When the arrangement is switched on, the control device B delivers a signal to the speed regulator V, which consequently brings the motor M to a speed $v_2$. However, owing to the elastic coupling E the load L initially lags behind the motor. After a given time, during which the load first reaches its equilibrium position relative to the motor, the timing switch T delivers a signal to the control device B which then commands the speed regulator V to bring the motor M to a third speed $V_3$ which is equal to that of the load. As a result, the load and the motor will henceforward run stationary with respect to each other. In the case of stopping, the same procedure takes place in reverse order.

In FIG. 4, the timing switch T of FIG. 3 has been replaced by a position detector P which is connected to the motor M and to the load L and determines their relative positions. In accordance with the difference in position a signal is applied to the control device B. During starting the motor M is brought to a speed $v_2$, the load L again lagging initially but then moving to its equilibrium position relative to the motor. From the difference in the positions of the load L and the motor M the position detector P derives a signal which is applied to the control device B. In accordance with this signal, the control device B commands the speed regulator V to increase the speed of the motor M until, at the instant at which the equilibrium position is reached, the speeds of the motor M and of the load L are once again equal. The increase in the motor speed may be effected comparatively abruptly or gradually. The former will be the case when the inertia of the motor itself is very small relative to the load, while the latter will happen in all other cases. The motors used may be of any type, such as direct-current motors having various kinds of speed controls, stepping motors in which the speed is controlled by changing the frequency of the supply pulses, and so on. In this arrangement also, stopping is effected by using the reverse procedure.

FIG. 5 shows a circuit arrangement for controlling a stepping motor M in which arrangement the signal generator is a forwards and backwardscounter C. One input of the counter is connected to the control device B, while the speed regulator V coupled to this device is provided with terminals to which the stepping motor M may be connected. The speed regulator V is connected to a backwards counting input of the counter C for feeding back a signal at the frequency of the motor supply pulses. The number of steps to be taken by the motor is introduced into the counter C so that the control device B receives a signal which it converts into a command for the speed regulator V ordering it to bring the speed of the motor from a first value $v_1$, which here is equal to zero, to a second value $v_2$. This is effected by feeding the stepping motor M with pulses at a frequency which corresponds to the desired stepping speed of the motor M. A signal at the same frequency is applied to a backwards counting input of the counter. The load L, which is connected to the motor M through an elastic coupling E, will initially lag behind the motor movement and then return to its equilibrium position relative to the motor. In the case under consideration the load L of the motor M is constant and may, for example, be a carriage on which are mounted magnetic heads which scan the concentric tracks on a disc of a disc memory. The stepping motor moves these heads to the track to be scanned. This arrangement permits of determining after which time, i.e. after which number of pulses, the load L has again reached its equilibrium position relative to the motor M, whereupon the counter C applies a signal to the control device B which causes the speed of the motor M to be brought, by way of the speed regulator V, to a third value $v_3$ which is equal to the speed of the load L. When the motor is in a position which is remote from the desired end position by a given number of steps, the counter C again applies a signal to the control device B, which causes the latter to reduce the motor speed to the value $v_2$ by means of the speed regulator V. The load L initially continues running at the speed $V_3$, but then reverses direction and at the instant at which it has again reached its equilibrium position relative to the motor M, it has a speed relative to the surroundings which is equal to zero. This permits the carriage to be locked in this position by a mechanical pawl mechanism without large forces being exerted thereon by hunting phenomena, for at this instant the counter C has reached the desired end position and stops the motor via the control device B and the speed regulator V.

What is claimed is:

1. A method of controlling a motor coupled to a load in an elastic subcritically damped manner wherein a speed variation is effected in at least one velocity step made up of two stages and comprising, bringing the motor from a first speed to a second speed during the first stage of said step whereupon the load initially persists in its initial movement and then moves towards its equilibrium position relative to the motor, and bringing the motor from the second speed to a third speed at a time during the second stage of said step such that the third speed is reached when the load reaches the said equilibrium position for the first time, the speed difference between the motor and the load then being substantially equal to zero.

2. A method as claimed in claim 1, characterized in that the second stage of a given step coincides with the first stage of the next velocity step.

3. A speed control arrangement for a motor coupled to a load in an elastic sub-critically damped manner comprising, a control device having an output coupled to a speed regulator which in turn is connected to the motor and is adapted to adjust the motor speed to at least three distinct values under the command of said control device, a signal generator having an output connected to an input of said control device and arranged to apply a signal to the control device after the motor speed has been changed by the control device from a first value to a second value but before the load has reached its equilibrium position relative to the motor, the control device being responsive to said signal to cause the motor to reach a third value of speed by means of the speed regulator at the instant at which the load has for the first time substantially reached said equilibrium position relative to the motor whereby the speed difference between the load and the motor is substantially equal to zero at said instant of equilibrium.

4. An arrangement as claimed in claim 3, characterized in that the signal generator comprises a timing switch arranged to supply said signal to the control device after a predetermined fixed period of time.

5. An arrangement as claimed in claim 3, wherein the signal generator includes a detector which detects the position of the load relative to its equilibrium position to derive a speed control signal for the control device in accordance therewith.

6. An arrangement as claimed in claim 3 wherein said motor comprises a stepping motor and the signal generator includes a forwards and backwards counter, means for introducing the desired number of motor steps into the counter, means connecting an output of the counter to the control device, means connecting the output terminals of the speed regulator to the stepping motor, and means connecting the speed regulator to a backwards counting input of the counter for feeding back a signal thereto at the frequency of the motor supply pulses.

7. In a motor speed control system wherein the load is elastically coupled to the motor, the system comprising, a control device having an output coupled to an input of a speed regulator device, means connecting the output of said speed regulator to the motor, said speed regulator being responsive to command signals from the control device to adjust the motor speed to at least three distinct values in sequence, a signal generator having an output connected to an input of the control device for applying a signal thereto at a time after the motor speed has been changed under command of the control device from a first speed to a second speed but before the load has reached an equilibrium position relative to the motor for the first time, the control device being responsive to said signal to command the speed regulator to adjust the motor speed to a third value which is substantially equal to the load speed at the instant the load for the first time reaches said equilibrium position.

8. A control system as claimed in claim 7 wherein said signal generator comprises a detector arranged to detect the position of the load relative to the motor and including means for supplying a signal to the control device as a function thereof.

9. A control system as claimed in claim 7 wherein said control device is arranged to supply command signals to said regulator that are independent of the load, said system further comprising an elastic coupling member between the load and the motor shaft.

* * * * *

UNITED STATES PATENT AND TRADEMARK OFFICE

CERTIFICATE OF CORRECTION

PATENT NO. : 3,947,742

DATED : March 30, 1976

INVENTOR(S) : PAUL A.F. VAN ACKER

It is certified that error appears in the above-identified patent and that said Letters Patent are hereby corrected as shown below:

IN THE TITLE

After "OF" insert -- AND APPARATUS FOR --;

Col. 2, line 20, cancel "has";

Col. 3, line 59, cancel "according to" and insert -- along --;

Col. 5, line 3, cancel "backwardscounter" and insert -- backwards counter --;

line 4, cancel "input" and insert -- output --;

Signed and Sealed this

*eighth* Day of *June 1976*

[SEAL]

*Attest:*

RUTH C. MASON
*Attesting Officer*

C. MARSHALL DANN
*Commissioner of Patents and Trademarks*